US009413625B2

(12) United States Patent
Le Pallec et al.

(10) Patent No.: US 9,413,625 B2
(45) Date of Patent: Aug. 9, 2016

(54) AUTOMATIC CAPTURE OF THE NETWORK DELAY COMPONENTS

(75) Inventors: Michel Le Pallec, Nozay (FR); Dinh Thai Bui, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 283 days.

(21) Appl. No.: 13/982,622

(22) PCT Filed: Feb. 1, 2012

(86) PCT No.: PCT/EP2012/051615
§ 371 (c)(1),
(2), (4) Date: Dec. 12, 2013

(87) PCT Pub. No.: WO2012/104326
PCT Pub. Date: Aug. 9, 2012

(65) Prior Publication Data
US 2014/0092922 A1    Apr. 3, 2014

(30) Foreign Application Priority Data

Feb. 1, 2011   (EP) .................................... 11290071

(51) Int. Cl.
*H04L 12/26*   (2006.01)
*H04J 3/06*    (2006.01)

(52) U.S. Cl.
CPC ........... *H04L 43/0858* (2013.01); *H04J 3/0685* (2013.01); *H04L 43/50* (2013.01); *H04J 3/0667* (2013.01)

(58) Field of Classification Search
CPC .................................................. H04L 43/0858
See application file for complete search history.

(56) References Cited

U.S. PATENT DOCUMENTS

| 8,274,998 | B2 * | 9/2012 | Belhadj et al. ................ 370/503 |
| 8,718,482 | B1 * | 5/2014 | Roberts et al. ................ 398/161 |
| 2004/0105391 | A1 | 6/2004 | Charcranoon |
| 2009/0310625 | A1 * | 12/2009 | Roberts ................ H04J 3/0661 370/498 |
| 2011/0051754 | A1 * | 3/2011 | Lansdowne ................... 370/503 |

(Continued)

FOREIGN PATENT DOCUMENTS

| CN | 1505347 A | 6/2004 |
| CN | 101399655 A | 4/2009 |

(Continued)

OTHER PUBLICATIONS

Sven Meier, "IEEE 1588 Syntonization and Synchronization Functions Completely Realized in Hardware", Sep. 22-26, 2008, International IEEE Symposium on Precision Clock Synchronization for Measurement, Control and Communication, ISBN: 978-1-4244-2274-6, XP002636158.

(Continued)

*Primary Examiner* — Jason Mattis
(74) *Attorney, Agent, or Firm* — Harness, Dickey & Pierce, P.L.C.

(57) ABSTRACT

In a method for monitoring the residence time across nodes of a communication network including a transparent clock-based synchronization architecture, the method includes configuring and generating a tunable and traceable packet dedicated to delay measurements. The method further includes measuring the packet resident time across a network node by a transparent clock, storing, at the level of the network node, the measured residence time, and retrieving the stored residence time by a Network protocol.

13 Claims, 1 Drawing Sheet

(56) References Cited

U.S. PATENT DOCUMENTS

| | | | | |
|---|---|---|---|---|
| 2012/0027414 A1* | 2/2012 | Wei | ...................... | H04J 3/0655 398/100 |
| 2012/0072761 A1* | 3/2012 | Guo | ...................... | H04J 3/0673 713/600 |
| 2012/0128011 A1* | 5/2012 | Holmeide et al. | ............ | 370/474 |

FOREIGN PATENT DOCUMENTS

| | | |
|---|---|---|
| CN | 101599894 A | 12/2009 |
| CN | 101827098 A | 9/2010 |
| CN | 101867489 A | 10/2010 |
| EP | 1427137 A2 | 6/2004 |
| JP | 2013501433 A | 1/2013 |
| JP | 2013516928 A | 5/2013 |
| WO | WO-0239673 A1 | 5/2002 |
| WO | WO-2011025746 A1 | 3/2011 |

OTHER PUBLICATIONS

Dinh Thai Bui, "Packet Delay Variation Management for a Better IEEE1588V2 Performance", Oct. 12-16, 2009, International IEEE Symposium on Precision Clock Synchronization for Measurement, Control and Communication, ISBN: 978-1-4244-4391-8, XP031570876.

Jiho Han, "A Practical Implementation of IEEE 1588-2008 Transparent Clock for Distributed Measurement and Control Systems", IEEE Transactions on Instrumentation and Measurement, vol. 59, No. 2, Feb. 2010, pp. 433-439, XP011282653.

Sebastien Jobert, "Issues With the Transparent Clock Concept of PTPv2 in a Telecom Environment", ITU-T Drafts, Study Period 2009-2012, International Telecommunication Union, vol. Study Group 15, Sep. 21, 2010, pp. 1-4, XP017448434.

G. Almes, "A One-Way Delay Metric for IPPM", rfc2679.txt, Sep. 1, 1999, XP015008462, ISSN: 0000-0003.

International Search Report PCT/ISA/210 for International Application No. PCT/EP2012/051615 Dated on Feb. 1, 2012.

International Written Opinion PCT/ISA1237 for International Application No. PCT/EP2012/051615 Dated on Feb. 1, 2012.

European Office Action Application No. 11 290 071.7 Dated Mar. 18, 2013.

* cited by examiner

AUTOMATIC CAPTURE OF THE NETWORK DELAY COMPONENTS

This application is the national phase under 35 U.S.C. §371 of PCT International Application No. PCT/EP2012/051615 which has an International filing date of Feb. 1, 2012, which claims priority to European patent application EP 11290071.7 filed Feb. 1, 2012; the entire contents of each of which are hereby incorporated by reference.

FIELD OF THE INVENTION

The disclosed invention pertains to the technical field of communication networks delay/latency monitoring.

BACKGROUND OF THE INVENTION

Network-introduced delays are amongst the most important network performance metrics as they directly impact several wide area network applications ranging from real-time applications such as VoIP, interactive network gaming, to time-critical financial applications and localization systems.

Thus, monitoring the performance of data transmission delay within networks must involve a detailed understanding of how and where these delays are introduced.

Within traditional Time Division Multiplexing (TDM) technologies, network delay is predictable as per the deterministic transition time across TDM switches (e.g. in term of number of system clock transitions). However, with the tremendous increase in bandwidth demand, TDM is progressively replaced by Packet Switch Networks (PSNs) where packet jitters, also called as packet delay variations (random processes essentially induced by packet queuing), make packet resident time within the network node (called as network node resident time or transit delay from now on) unpredictable.

Accordingly, more than ever do PSN (Packet Switched Network) operators need methods for monitoring network delay (also known as network latency) in order to be able to take appropriate actions (e.g. network redesign/reconfiguration) aiming at respecting the Service Level Agreements (SLAs) and correcting SLA violations in term of network delay/latency.

To address these problems, Network operators generally rely on various end-to-end time-delay measurement tools such as
- the PING command defined over the Internet Control Message Protocol (ICMPv4-RFC 792 and ICMPv6-RFC4443) which allows for measuring the end-to-end round-trip delay from a source to a destination host within an IP network;
- the one-way delay measurement method described by RFC 2679. This method may require time synchronization depending on the network delay/latency value, on the required precision of the measurement and on the clock accuracy at both ends;
- the traceroute (or TraceRT) command allowing to figure out the address of each network node (i.e. each network-layer device) along a network path from a source to a destination host. Traceroute also returns the end-to-end delays, respectively, from the source to each traversed node within the network path. These end-to-end delays are returned at the application level, meaning at the network protocol layer supporting the traceroute command.

However, these tools return the whole end-to-end delay without any precision on the network node resident time (or latency). In other words, by using these tools, the returned delay value is a single unitary component, already including the network node resident time without any precision thereon.

The network-introduced delay may be broadly divided into:
- network node resident time, comprising:
  - the time needed by a network node to process (processing delay) a packet and prepare it for (re)transmission. The processing delay is mainly a function of the protocol stack complexity and of the computational power available (i.e. the available hardware) at each node and of the card driver (or interface card logic); and
  - the queuing delay, i.e. the total waiting time of packets within buffers of a network node before processing and/or transmission, which may depends on the details of the switching (or lower layer switches) of the network node
- the transit/link delay along network segments that link network nodes: the time needed to transmit an entire packet (from first bit to last bit) or more basically a single bit from the output port of a first network node to the input port of a second network node.

Accordingly, knowing the whole end-to-end delay in a single value without giving any details on its components, up-to-date end-to-end delay measurement tools do not permit the operator to figure out the network segment(s) or the network node(s) where exactly corrective actions should be applied.

Thus, the main issue remains the collection of locally measured network nodes and network segments transit delays.

Yet another problem of the prior art is that it does not permit to determine what fractions represent residence time across network node or along network segment from the whole end-to-end delay.

A further problem is that known methods do not permit to obtain at once a distributed view of network nodes residence times, but end-to-end delays per network path taken separately.

One possible object of the present invention is to address the above-noted and other problems with the related art.

Another possible object of the present invention is to pinpoint where dominant delays are introduced within distributed network nodes.

Another possible object of the present invention is to provide a fine-grained composition of the network-introduced delays.

Another possible object of the present invention is the simultaneous determination of per-node latencies within a communication network.

Another possible object of the present invention is to provide a method and a system permitting to obtain a fine-grained distributed view of residence times per network node.

Another possible object of the present invention is to provide a method and a system permitting to obtain a fine-grained distributed view of residence times per delay-sensitive application.

Another possible object of the present invention is to split the end-to-end delay into components distinguishing the nodes resident times along a path from a source to a destination within an IP network.

Another possible object of the present invention is to allow operators to make rapid and precise diagnostic of the SLA violation issue (quality of the committed service not respected) in terms of network latency.

Another possible object of the present invention is to provide a diagnostic method that permits to accurately and simultaneously pinpoint network nodes that are sources of important (application) latencies.

Another possible object of the present invention is to uncover dominant network hops introducing the most latency and being responsible for delay degradation for a certain application.

DESCRIPTION OF THE DRAWING

The objects, advantages and other features of the present invention will become more apparent from the following disclosures and claims. The following non-restrictive description of preferred embodiments is given for the purpose of exemplification only with reference to the accompanying drawing in which like reference numerals refer to similar elements and wherein

SUMMARY

Figure 1:
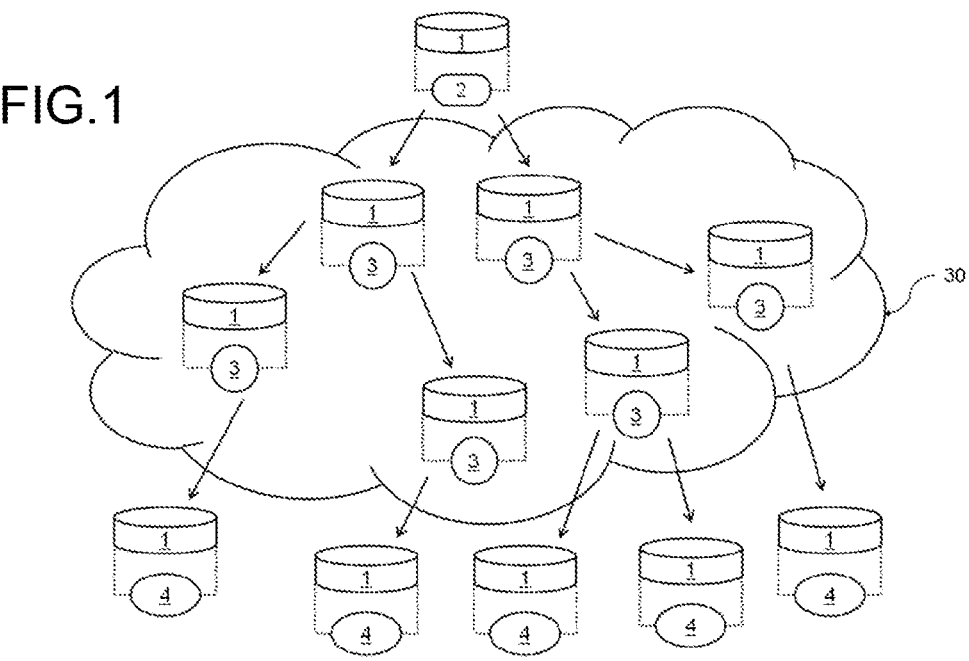
FIG. 1 is a block diagram illustrating the deployment context of embodiments.

The some embodiments of the present invention are directed to addressing the effects of one or more of the problems set forth above. The following presents a simplified summary of some embodiments of the invention in order to provide a basic understanding of some aspects of the invention. This summary is not an exhaustive overview of the invention. It is not intended to identify critical elements of the invention or to delineate the scope of the invention. Its sole purpose is to present some concepts in a simplified form as a prelude to the more detailed description that is discussed later.

The embodiments of the present invention relate to a method for monitoring the residence time across nodes of a communication network including a transparent clock-based synchronization architecture, said method comprising the following steps
configuring and generating a traceable packet dedicated to delay measurements;
measuring the packet resident time across a network node by a transparent clock;
storing, at the level of the network node, the measured residence time;
retrieving the stored residence time by a Network protocol.

In accordance with a broad aspect, the configured traceable packet dedicated to delay measurements is a modified PTPV2 packet.

In accordance with another broad aspect, the above cited method further comprises a parameterization step of the traceable packet. This packet is parameterized with respect to at least a characteristic parameter of a delay-sensitive application packet. QoS—Quality of Service—value and packet length are examples of the said characteristic parameter.

In accordance with another broad aspect, the cited above method further comprises a multicast sending step of the configured traceable packet.

The embodiments of the present invention further relate to a network node provided with a transparent clock, comprising
means for storing therein the locally measured residence time of a packet across the said network node;
an interworking interface with a Network protocol permitting it to retrieve the stored packet residence time.

In accordance with a broad aspect, the transparent clock is an IEEE 1588V2 Peer-to-Peer Transparent Clock or an IEEE 1588V2 end-to-end Transparent Clock.

The embodiments of the present invention further relates to a computer program product adapted to perform the method cited above.

While embodiments of the invention are susceptible to various modifications and alternative forms, specific embodiments thereof have been shown by way of example in the drawings. It should be understood, however, that the description herein of specific embodiments is not intended to limit the invention to the particular forms disclosed.

It may of course be appreciated that in the development of any such actual embodiments, implementation-specific decisions should be made to achieve the developer's specific goal, such as compliance with system-related and business-related constraints. It will be appreciated that such a development effort might be time consuming but may nevertheless be a routine understanding for those or ordinary skill in the art having the benefit of this disclosure.

DETAILED DESCRIPTION OF ILLUSTRATIVE EMBODIMENTS

With reference to FIG. 1, there is shown a communication network (or sub-network) 30 wherein an IEEE 1588V2 Transparent Clock (TC) 3 architecture is deployed.

IEEE 1588V2 protocol, also known as Precision Time Protocol release 2 (PTPV2), is a synchronization protocol intended for aligning time (or, equivalently frequency) scale of one or more PTPV2 Slaves 4 clock to a PTPV2 (Grand) Master 2 clock, embedded in respective distributed network nodes 1. The network node 1 may be a bridge, a router, a switch, a repeater, or more generally a network device.

Within a TC-based synchronization architecture as depicted in FIG. 1, TCs 3 provide corrections for PTPV2 packet (SYNC, DELAY_REQ, DELAY_RES for example) residence times across network nodes 1. The residence time (or transit delay) of a PTPV2 packet/message across a network node 1 corresponds, here, to the time needed by the timing message to propagate from an ingress port to an egress port of the network node 1.

Accordingly, each network node 1 along a network path linking a PTPV2 (Grand)Master 2 clock and a PTPV2 Slave 4 clock is provided with a TC 3 programmed for adjusting the PTPV2 packet delay with respect to its residence time across the network node 1 or along a network segment. By a network segment is intended to mean here the network path linking only two successive network nodes 1, each one being supported by a TC 3.

Both, IEEE 1588V2 Peer-to-Peer Transparent Clocks (P2P TC 3) and End-to-End Transparent Clocks (E2E TC 3) are considered, here. E2E TC permits to locally measure each traversed network node 1 transit delay (of PTPV2 messages) allowing the correction of the PTPV2 packet delay. P2P TC permits to measure and correct both network segment and network node 1 transit delays. For network segments demonstrating constant packet delays, the whole link delay can be provisioned at the PTPV2 Slave 4 (or PTPV2 Master 2) level, and even at the E2E TC level. Consequently E2E TC can suffice.

Each TC 3 adds to the cumulative "correction field" of PTPV2 packets their respective resident time within the associated network node 1 as measured locally (and also the link delay in case of P2P TC 3).

Below, PTPV2 TC 3 capabilities are utilized in an advantageous manner to collect network nodes 1 and network segments transit delays in order to efficiently address the requirements of time-stringent applications, by configuring the PTPV2 messages so that they are representative of a time sensitive application.

Network node 1 residence times and network segments transit delays are collected by means of specific interactions involving an adapted (modified) PTPV2 signaling instance not dedicated for usual synchronization task (i.e. not intended to its prior art recognized synchronization function);

TC 3 functionalities; and network node 1 control planes.

These interactions are monitored by means of functional elements described below.

To that end, tunable (i.e. adjustable, adaptable, alterable, parameterable) and traceable (i.e. identifiable, distinguishable) packets dedicated to delay measurements are configured/generated.

In fact, a collection of parameterized PTPV2 packets/messages is generated, and then transmitted for crossing each network nodes 1 and network segments (i.e. related to a network node 1 with an adjacent link).

Accordingly, these modified PTPV2 messages are intended for collecting network nodes 1 and/or adjacent network segments transit delays, being representative of time sensitive application parameters. These messages are not dedicated to a synchronization purpose.

In one embodiment, a new PTPV2 field, following the TLV (Type Length Value field) semantics and including stuffing bits, is proposed. The aim of such TLV is to provide tunable PTPV2 packet sizes from the minimal size imposed by the PTPV2 standard to a maximum size allowing for collecting network delays.

Alternatively or in combination, packet priority codes—QoS—could be similarly tuned for capturing related Network node residence times.

The packet collection dedicated to a delay measurement purpose utilizes SYNC and DELAY_REQ messages in order to cover, both, PTPV2 (Grand)Master 2/PTPV2 Slave 4 and PTPV2 Slave 4/PTPV2 Master 2 directions.

In fact, a new TLV field for conventional PTPV2 SYNC and DELAY_REQ packets is added, thus becoming tunable and traceable packets for a latency measurement purpose. This TLV is dedicated to stuffing bits in order to capture transit delay with respect to the packet size.

Different distinguishing features may be adopted to differentiate PTPV2 packets/messages dedicated to a latency measurement purpose from conventional PTPV2 ones (dedicated to a synchronization purpose). As examples, one can mention:

dedicating a "domain_Id" so that PTPV2 Master 2 and PTPV2 Slaves 4 ignore these modified PTPV2 flows that are dedicated only to a monitoring purpose, in their synchronization state-machine;

using a specific channel/tunnel (e.g. a VLAN or a MPLS LSP for example) in order to perform isolation between synchronization (regular) and "network monitoring" (modified) PTPV2 flows.

Figure 2:
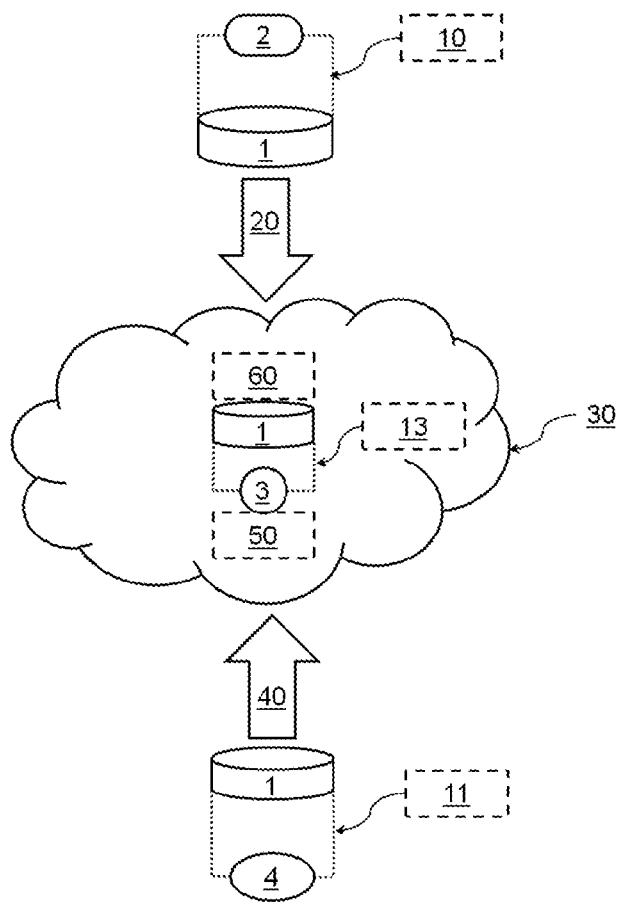
FIG. 2 is a block diagram illustrating functional elements of one embodiment.

Referring to FIG. 2, both modified SYNC 20 and modified DELAY_REQ 40 PTPV2 messages may hold a particular domain identifier such as "delay_capture" identifier.

The PTPV2 (Grand)Master 2 and PTPV2 Slave 4, respectively, generate modified SYNC 20 and modified DELAY_REQ 40 messages permitting to collect all network nodes 1/segments residence delays. To that end, a broadcast or a multicast scheme (meaning that the multicast groups gather all PTPV2 ordinary clocks: the PTPV2 (Grand)Master 2 and PTPV2 Slaves 4 within network 30) may be adopted so as to ease residence delays collection.

As a way to face multicast or broadcast sending restrictions, the superposition of Unicast sending can also be used. Note that PTPV2 Master 2 and PTPV2 Slaves 4 are, in principle, respectively located at the top and at the bottom level of the network (tree) architecture. Accordingly delays related to all networks nodes 1 are collectable through a multicast sending of modified SYNC 20 in the downstream (PTPV2 Master 2 towards PTPV2 Slave 2) direction. For the reverse direction (i.e. from PTPV2 Slave 4 towards PTPV2 Master 2), a combination of Unicast DELAY_REQ 40 messages may be a straightforward solution for collecting all network nodes 1 transit delays.

It is to be noted that the emission rates of modified PTPV2 messages SYNC and DELAY_REQ has to be carefully chosen in order to keep the associated bandwidth at a reasonable level with respect to the available Master 2/Slave 4 bandwidth.

Referring further to FIG. 2, interworking functions 10-11, performed by interworking modules located respectively at the PTPV2 (Grand)Master 2 and PTPV2 Slave 4 levels (i.e. respectively, for DELAY_REQ 40 upstream and SYNC 20 downstream directions), permit to interact with transport protocols in order to trigger delays measurements while varying different transport parameters (those impacting the network delays). As non-limitative examples of these parameters, one can mention:

QoS parameters: such as DiffServ Code Points (DSCP);

packet sizes/packet fragmentation.

In fact, as the network-introduced delay may be differ from one application flow to another, the set of PTPV2 packet parameters (QoS, Time-To-Live, length for example) may be adjusted so as to imitate the characteristic parameters of different delay-sensitive application flows.

In other words, by appropriately parameterizing PTPV2 flows (i.e. controlling the different values of the PTPV2 packet parameters), one can estimate the network-introduced delay/latency per application.

As illustrative examples, one can assign a high priority QoS (e.g. Premium class as compared to Best-effort one) and a relatively intermediate packet length for a first PTPV2 flow, intended to reflect an estimation of the network-introduced delays in the case of a VoIP application;

a high priority QoS and a relatively long packet length for a second PTPV2 flow, intended to reflect an estimation of the network-introduced delay in the case of a real-time videoconference application.

It is worth mentioning that different parameters of the PTPV2 flows may be jointly monitored so as to fit the characteristic parameters of delay-sensitive application flows.

An interworking function 13 between TC 3 (PTPV2 plane) and the network node 1 is configured to analyze (a statistical analysis for example), store (step 60 in FIG. 2) measured residence delays across the network node 1 (or the associated network segment) at the level thereof, and interact with network protocols for the capture of network delays at the control plane level.

E2E TC 3 measures (step 50 in FIG. 2) transit delay of modified SYNC 10 and modified DELAY_REQ 40 PTPV2 messages across the network node 1. The measured transit delay is, then, analyzed and stored (step 60 in FIG. 2) by the interworking function 13 at the network node 1 level. Alternatively, a centralized storage mechanism, located for instance within a network/synchronization management system, may be performed.

While considering network node 1 transit delays, an embodiment would be to collect statistical delays and to store relevant data in order to efficiently drive real-time services. Accordingly, one way may be to store logs of mean, minimum, maximum delays, delay variance (very important for driving real-time applications) with respect to a given observation time (interval). This latter can be chosen to be representative of a mean application connection duration.

Preferably, transit delays are stored in association with specific parameter/variable (QoS, Packet Size for example) combinations.

In case of P2P TC 3, the transmission delays of the links adjacent to network node 1 are measured (step 50 in FIG. 2) and thus can be part of the stored (step 60 in FIG. 2) information by the interworking function 13.

Targeting a subsequent use of this stored information by the network control plane, it is accessible to transport protocols. Accordingly, an interworking interface between the PTPV2 protocol and the network protocols in order to retrieve this information accessible to the network control plane. The stored information is accessible to the network control plane such as RSVP (Resource reservation protocol), OSPF (Open shortest path first).

As an illustrative example wherein the highest QoS (premium packets) and a packet size of 1300 bytes, related transit delay would be collected for each network node 1 at a collection rate of 1 per second. Then, Min, Max, Mean, Variance parameters could be derived—for instance—over a sample of 20 successive measurements.

Advantageously, the above described method and system allow for accurately collecting the network nodes packet delays within a distributed view, meaning that the delays are collected and stored at the network node 1 levels thanks to multiple collaboration schemes between the PTPV2 plane and the network plane.

The above described method provides further tools for efficiently monitoring the network while considering the latency requirements of real-time applications (Voice, Video conferencing, Games for example).

The above described method allows an operator to point out the network segment(s) or network node(s) and even protocol module(s) within the incriminated node(s) which need corrective actions.

Advantageously, the above described method can be implemented within a contiguous network segment built-up with the majority of conventional network node products supported by TCs.

The proposal may be considered as a standard for accurately measuring network nodes residence times and network segments with respect to given parameters and for subsequently monitoring network delays experienced by time sensitive applications.

The invention claimed is:

1. A method for monitoring a residence time across a plurality of nodes of a communication network including a transparent clock based synchronization architecture according to Precision Time Protocol release 2 (PTPV2), said method comprising:
    configuring and generating a modified PTPV2 packet, the modified PTPV2 packet being used for at least measuring the residence time but is not used for a synchronization purpose;
    measuring the residence time of the modified PTPV2 packet across a at least one node of the plurality of nodes, by a transparent clock;
    storing the measured residence time; and
    retrieving the stored residence time using a network protocol.

2. The method of claim 1, further comprising:
    parameterizing the modified PTPV2 packet.

3. The method of claim 2, wherein the parameterizing parameterizes the modified PTPV2 packet with respect to at least a parameter of a delay-sensitive application packet.

4. The method of claim 3, wherein the parameter is a quality of service (QoS).

5. The method of claim 3, wherein the parameter is a packet length.

6. The method of claim 1, wherein the modified PTPV2 packet is a modified PTPV2 delay request packet.

7. The method of claim 1, wherein the storing stores the measured residence time in a centralized storage.

8. The method of claim 1, further comprising:
    analyzing the measured residence time.

9. The method of claim 1, further comprising:
    multicast sending of the modified PTPV2 packet.

10. A network node supported by a transparent clock, the network node comprising:
    a memory including computer readable instructions stored therein; and
    a processor configured to execute the computer readable instructions to,
        configure and generate a modified Precision Time Protocol release 2 (PTPV2) packet, the modified PTPV2 packet being used for at least measuring a residence time but is not used for a synchronization purpose;
        measure the residence time of the modified PTPV2 packet across said network node, using the transparent clock;
        store the measured residence time; and
        retrieve the stored residence time using a network protocol.

11. The method of claim 10, wherein the transparent clock includes an IEEE 1588 version 2 Peer-to-Peer Transparent Clock.

12. The method of claim 10, wherein the transparent clock includes an IEEE 1588 Version 2 end-to-end Transparent Clock.

13. A non-transitory computer readable medium comprising computer-readable instructions which when executed by a processor, cause the processor to,
    configure and generate a modified Precision Time Protocol release 2 (PTPV2) packet, the modified PTPV2 packet being used for at least measuring a residence time but is not used for a synchronization purpose;
    measure the residence time of the modified PTPV2 packet across at least one node of a plurality of nodes of a communication network, by a transparent clock;
    store the measured residence time; and
    retrieve the stored residence time using a network protocol.

* * * * *